D. E. WHITON.
Lathe Chuck.
No. 83,349.
Patented Oct. 20, 1868.
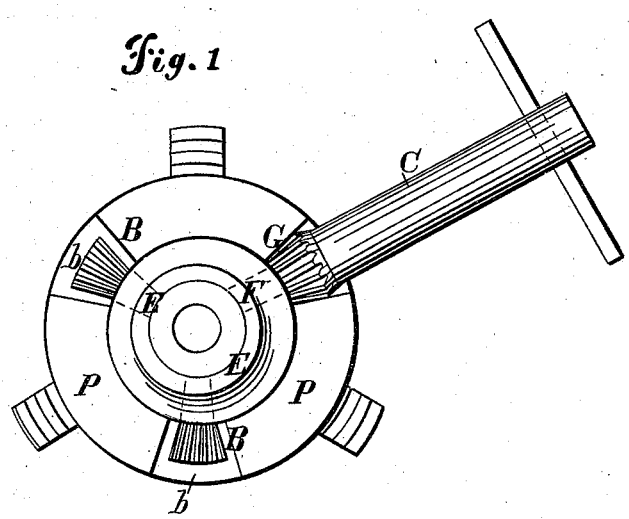
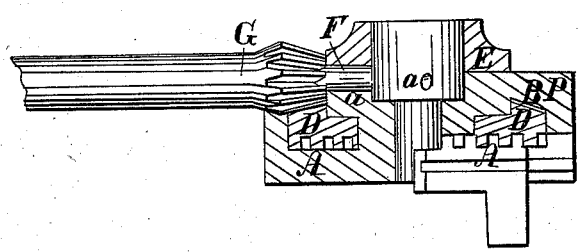

D. E. WHITON, OF WEST STAFFORD, CONNECTICUT.

Letters Patent No. 83,349, dated October 20, 1868.

IMPROVED LATHE-CHUCK.

The Schedule referred to in these Letters Patent and making part of the same.

*To all whom it may concern:*

Be it known that I, D. E. WHITON, of West Stafford, Tolland county, State of Connecticut, have invented a new and useful Improvement in Chucks; and I do hereby declare that the following is a full and clear description thereof, reference being had to the accompanying drawings, and to the letters of reference marked thereon.

In the drawings—

Figure 1 is a plan view, and

Figure 2 a sectional view of my improvement.

This invention consists of a new and useful arrangement of parts in a scroll-chuck, by which the same is made much lighter and of more convenient operation.

The chuck is of that construction known as a "scroll-chuck," the jaws being operated by a continuous convergent groove, A, in the face of the plate D, which is itself operated by a circular rack, B, on the back of it, as I will now describe.

Ordinarily, the rack B was made to mesh with a single pinion, secured in bearings within the chuck behind the rack, and this was turned by means of a separate wrench, with a socket in the end, a socket being made in the perimeter of the chuck for the end of the wrench to fit in around the arbor of the pinion. This can be seen in all geared scroll-chucks. In my improved arrangement, however, I use a pinion, (to turn the rack B,) formed upon the shank of a handle or wrench, C, fig. 1, and openings are made in the back-plate P of the chuck, for the pinion to work in. The stock at the back of the chuck is carried out into a projection, E, of sufficient width to allow sockets *a a a* to be made in its perimeter, for the end of the shank F of the handle to turn in, these sockets forming the bearings for the handle, and enabling the rack B to be turned by the pinion G upon it.

The handle C thus takes the place of both fixed pinion and wrench, and allows the chuck to be made much thinner, the width that would be required in the case of the fixed pinion being totally dispensed with, and only enough width being required in the projection E for the sockets *a a a;* the back-plate P being formed next to the rack, and the openings *b b*, &c., disclosing the rack sufficiently for the pinion G to mesh with it, in either of its positions, when the handle is put in place for turning it. Also, by making three or more openings for the pinion to gear with the circular rack, the chuck is made more durable by wearing more evenly, and is much more conveniently operated.

Now, having described my invention,

What I claim as new, and desire to secure by Letters Patent, is—

The construction and arrangement of the back-plate P, with openings *b b b*, and projection E, with sockets *a a a*, when connected with the rack B of a geared chuck, substantially as and for the purpose herein shown.

D. E. WHITON.

Witnesses:
J. A. MEDANY,
E. L. WHITON.